(12) United States Patent
Hu et al.

(10) Patent No.: US 8,281,204 B2
(45) Date of Patent: Oct. 2, 2012

(54) METHOD AND ARRANGEMENT IN A TELECOMMUNICATION SYSTEM IN WHICH AN ACKNOWLEDGMENT MESSAGE IS FED BACK FOR A BUNDLE OF FRAMES

(75) Inventors: Yang Hu, Beijing (CN); Lei Wan, Beijing (CN); Zhiyi Xuan, Taby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 274 days.

(21) Appl. No.: 12/865,814

(22) PCT Filed: Nov. 7, 2008

(86) PCT No.: PCT/SE2008/051278
§ 371 (c)(1),
(2), (4) Date: Aug. 2, 2010

(87) PCT Pub. No.: WO2009/099370
PCT Pub. Date: Aug. 13, 2009

(65) Prior Publication Data
US 2010/0325508 A1 Dec. 23, 2010

Related U.S. Application Data

(60) Provisional application No. 61/025,979, filed on Feb. 4, 2008.

(51) Int. Cl.
*H04L 1/18* (2006.01)
(52) U.S. Cl. ........................................ 714/749; 714/776
(58) Field of Classification Search .................. 714/749, 714/776
See application file for complete search history.

(56) References Cited

U.S. PATENT DOCUMENTS
5,754,754 A 5/1998 Dudley et al.
(Continued)

FOREIGN PATENT DOCUMENTS
WO 0033502 A 6/2000
WO 0103359 A 1/2001

OTHER PUBLICATIONS

Ericsson, "Details of ACK/NAK bundling for TDD", 3GPP Draft, R1-081528, 3rd Generation Partnership Project (3GPP), Mobile Competence Centre; 650 Route des Lucioles; F-06921 Sophia-Antipolis Cedex, France, vol. tsg_ran\WG1_RL1\TSGR1_52b\Docs, No. Shenzhen, China; 20080331, Mar. 26, 2008, XP050109942, Section 2.3.2.

(Continued)

*Primary Examiner* — M. Mujtaba K Chaudry
(74) *Attorney, Agent, or Firm* — Rothwell, Figg, Ernst & Manbeck, P.C.

(57) ABSTRACT

A method in a receiving node for sending an acknowledgement/not acknowledgement "ACK/NACK" feedback report of received data units over a radio link is provided. When the receiving node have received (301) data units in a number of subframes over a first radio link from a sending node, it creates (302) an ACK/NACK feedback report. The report is compressed such that it comprises one single ACK/NACK feedback relating to the data units in the number of received subframes, and the report comprises an indicator indicating said number of received subframes. The sending node then transmits (303) the created ACK/NACK feedback report to the sending node over a second radio link. The feedback report renders it feasible for the sending node to decide whether a retransmission of any subframe is required or not based on a comparison of the reported number of received subframes with the known transmitted number of subframes per frame, together with the compressed ACK/NACK feedback report.

20 Claims, 3 Drawing Sheets

U.S. PATENT DOCUMENTS

| | | | | |
|---|---|---|---|---|
| 5,844,918 | A | * | 12/1998 | Kato .......................... 714/751 |
| 7,499,417 | B2 | * | 3/2009 | Kim et al. .................... 370/310 |
| 7,719,991 | B2 | * | 5/2010 | Bhushan et al. .............. 370/252 |
| 2002/0191544 | A1 | * | 12/2002 | Cheng et al. ................. 370/236 |

OTHER PUBLICATIONS

Ericsson, "Details of ACK/NAK bundling for TDD", 3GPP Draft, R1-081566, 3rd Generation Partnership Project (3GPP), Mobile Competence Centre; 650 Route des Lucioles; F-06921 Sophia-Antipolis Cedex, France, vol. tsg_ran\WG1_RL1\TSGR1_52b\Docs, No. Shenzhen, China; 20080331, Mar. 28, 2008, XP050109981, Section 2.3.2.

LG Electronics, "Bundled ACK/NACK in TDD", 3GPP Draft; R1-081815 TDD ACKNACK Bundling, 3rd Generation Partnership Project (3GPP), Mobile Competence Centre; 650, Route des Lucioles; F-06921 Sophia-Antipolis Cedex, France, vol. tsg_ran\WG1_RL1\TSGR1_53\Docs, No. Kansas City, USA; 20080505, Apr. 29, 2008; XP050110191, p. 4, para. 1.

Texas Instruments, "ACK/NAK DTX Detection with ACK/NAK Bundling in TDD" 3GPP Draft; R1-081985, 3rd Generation Partnership Project (3GPP), Mobile Competence Centre; 650, Route des Lucioles; F-06921 Sophia-Antipolis Cedex, France, vol. tsg_ran\WG1_RL1\TSGR1_53\Docs, No. Kansas City, USA; 20080505, Apr. 29, 2008; XP050110332.

* cited by examiner

301 Receive data units in a number of subframes over a radio link from a sending node.

302 Create a compressed ACK/NACK feedback report indicating information about the number of received subframes.

303 Transmit the created compressed ACK/NACK feedback report to the sending node.

| 501 | Transmit data units in a number of subframes to the receiving node. |

↓

| 502 | Receive a compressed ACK/NACK feedback report from the receiving node, which report indicates information about the number of received subframes. |

↓

| 503 | Decide whether a retransmission of any subframe is required or the reported number of received subframes. |

METHOD AND ARRANGEMENT IN A TELECOMMUNICATION SYSTEM IN WHICH AN ACKNOWLEDGMENT MESSAGE IS FED BACK FOR A BUNDLE OF FRAMES

CROSS-REFERENCE TO RELATED APPLICATION

This application is a 35 U.S.C. §371 National Phase Application from PCT/SE2008/051278, filed Nov. 7, 2008, and designating the United States, and claims priority to Provisional Application No. 61/025,979, filed Feb. 4, 2008. The above-mentioned applications are incorporated by reference herein.

TECHNICAL FIELD

The present invention relates to a method and arrangement in a sending node and in a receiving node in a telecommunication system. In particular the invention relates to handling an acknowledgement/not acknowledgement "ACK/NACK" feedback report.

BACKGROUND

In today's data communication, an amount of data is divided into individual units, which units are transmitted to a desired receiver over an appropriate communication path.

This form of data communication is very well known and in wide use. The sending node may e.g. be a radio base station and the receiving node may be a user equipment such as a mobile phone, portable computer, Personal Digital Assistant (PDA) or vice versa. Most of these systems use bi-directional radio communication where both nodes transmit and receive data units simultaneously or alternating.

Such data units carry a variety of names in the context of different communication systems and communication protocols, such as packets, frames, segment, protocol data units, etc. The term "data unit" as used in the present specification and claims, generically refers to any such division of a data amount.

In order to ensure the complete and correct transmission of data units from a transmitting to a receiving protocol peer, a mechanism referred to as HARQ (Hybrid Automatic Repeat reQuest) is often used. HARQ mechanisms are commonly part of link layer protocols such as the Radio Link Control (RLC) protocol or the Medium Access Control (MAC) protocol specified for the Universal Mobile Telecommunications System (UMTS) Terrestrial Radio Access Network (UTRAN) as well as for the Evolved-UTRAN. When using an HARQ mechanism, the receiver of data units sends reports, i.e. feedback reports, to the sender, such that the sender can determine whether sent data units were properly received, and if not, to appropriately perform retransmissions of data units.

A feedback report is a control data unit that is typically sent from the receiving entity of an HARQ protocol to the transmitting peer entity.

Feedback report s are often referred to as status message, status report, status, etc. They may have different formats depending on the protocol specification. Known implementations of such feedback reports comprise one or more references to protocol data units, or parts thereof, received or expected by the receiving protocol entity. These references are typically denoted as positive and/or negative acknowledgements and also referred to as ACK or NACK. An acknowledgement provides the transmitting protocol entity with information about successful or unsuccessful reception of one or more data units at the receiving protocol entity. Many of the known HARQ protocols assign a so-called sequence number (SN) to each data unit and use this sequence number as reference in status messages. A positive acknowledgement for the data unit with a given sequence number may then be referred to as ACK whereas a negative acknowledgement may be denoted as NACK. Widely, known protocols use lists and/or bitmaps in feedback reports. An acknowledgement may be explicit, i.e., represent the state of one particular data unit or it may be cumulative, i.e., provide information about the state of a collection of data units.

Time Division Duplexing (TDD) is a transmission scheme that allows an asymmetric flow for uplink and downlink transmission which is well suited to data transmission. In a TDD system, a common carrier is shared between the uplink and downlink, the resource being switched in time. Users are allocated one or more timeslots for uplink and downlink transmission. In TDD system, the Down Link/Up Link (DL)/(UL) asymmetry scenario makes the ACK/NACK design for HARQ a hard problem. In the scenarios of heavy DL transmission or heavy UL transmission, multiple ACK/NACKs per user within a TDD frame have to be treated in the limited UL or DL control channel respectively. One way to reduce the number of ACK/NACK reports is to compress the multiple ACK/NACK reports, e.g. by bundling method. In current LTE rel-8, multiple ACK/NACK can be compressed by 'AND' operation for each code-word across multiple subframes, namely bundling method.

However, after the compression of multiple ACK/NACK reports, it is hard to distinguish which ACK/NACK feedback corresponds to which Transmission Time Interval (TTI) and Discontinuous Transmission (DTX) cannot be reported in a good way. DTX means that a missing DL assignment occurs. E.g. eNodeB schedules a subframe indicated by downlink assignment in physical control channel (PDCCH) for a certain user equipment but the user equipment misses the downlink assignment in PDCCH. In ACK/NACK bundling mode, eNodeB is hard to know whether the user equipment missed some downlink assignments across multiple subframes or not. DTX report is a way for eNodeB to know whether the user equipment missed downlink assignments or not.

It has been found that the misdetection of DTX will cause a serious throughput loss above Transport Control Protocol (TCP) layer, due to the burst large delay caused by Radio Link Control (RLC) layer ARQ. (HARQ is in MAC layer, and ARQ is in RLC, which means higher layer RLC will also check the correctness of downlink data transmission.) RLC is a link-layer protocol that is responsible for error recovery and flow control in 3G (UMTS) cellular systems. 1% detection error of DTX to ACK will cause around 20% TCP throughput loss.

SUMMARY

An object of embodiments herein is to provide a mechanism for improving the handling of acknowledgement/not acknowledgement "ACK/NACK" feedback reports.

According to a first aspect, the object is achieved by a method in a receiving node for sending an acknowledgement/not acknowledgement "ACK/NACK" feedback report of received data units over a radio link. When the receiving node has received data units in a number of subframes over a first radio link from a sending node, it creates an ACK/NACK feedback report. The report is compressed such that it comprises one single ACK/NACK feedback relating to the data units in the number of received subframes, and the report comprises an indicator indicating said number of received subframes. The sending node then transmits the created ACK/NACK feedback report to the sending node over a second radio link. The feedback report renders it feasible for the sending node to decide whether a retransmission of any subframe is required or not based on a comparison of the reported number of received subframes with the known transmitted number of subframes per frame, together with the compressed ACK/NACK feedback report.

According to a second aspect, the object is achieved by a method in a sending node for handling of an acknowledgement/not acknowledgement "ACK/NACK" feedback report sent from a receiving node over a radio link. The sending node transmits data units in a number of subframes to the receiving node over a first radio link. The receiving node then receives an ACK/NACK feedback report from the receiving node over a second radio link.

The report is compressed such that it comprises one single ACK/NACK feedback relating to data units associated to the number of received subframes and comprises an indicator indicating said number of received subframes. The sending node then decides whether a retransmission of any subframe is required or not based on a comparison of the indicated number of received subframes with the known transmitted number of subframes per frame, together with the compressed ACK/NACK feedback.

According to a third aspect, the object is achieved by an arrangement in a receiving node for sending an acknowledgement/not acknowledgement "ACK/NACK" feedback report of received data units over a radio link. The receiving node arrangement comprises a receiving unit configured to receive data units in a number of subframes over a first radio link from a sending node. The receiving node arrangement further comprises a creating unit configured to create an ACK/NACK feedback report. The report is compressed such that it comprises one single ACK/NACK feedback relating to the data units in the number of received subframes, and comprises an indicator indicating said number of received subframes. The receiving node arrangement further comprises a transmitting unit configured to transmit the created ACK/NACK feedback report to the sending node over a second radio link. The feedback report renders it feasible for the sending node to decide whether a retransmission of any subframe is required or not based on a comparison of the reported number of received subframes with the known transmitted number of subframes per frame, together with the compressed ACK/NACK feedback report.

According to a fourth aspect, the object is achieved by an arrangement in a sending node for handling of an acknowledgement/not acknowledgement "ACK/NACK" feedback report sent from a receiving node over a radio link. The sending node arrangement comprises a transmitting unit configured to transmit data units in a number of subframes to the receiving node over a first radio link. The sending node arrangement further comprises a receiving unit configured to receive an ACK/NACK feedback report from the receiving node over a second radio link. The report is compressed such that it comprises one single ACK/NACK feedback relating to data units associated to the number of received subframes, and comprises an indicator indicating said number of received subframes. The sending node arrangement further comprises a deciding unit configured to decide whether a retransmission of any subframe is required or not based on a comparison of the indicated number of received subframes with the known transmitted number of subframes per frame, together with the compressed ACK/NACK feedback.

Since the compressed report comprising only one single ACK/NACK feedback relating to data units associated to the number of received subframes, also comprises an indicator indicating said number of received subframes, it is feasible for the sending node to decide whether a retransmission of any subframe is required or not based on a comparison of the reported number of received subframes with the known transmitted number of subframes per frame, together with the compressed ACK/NACK feedback report. I.e. it is easier to distinguish which ACK/NACK feedback corresponds to which subframe and to know which subframes to retransmit. This in turn implies a better throughput and an improved handling of acknowledgement/not acknowledgement "ACK/NACK" feedback reports.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and an arrangement which may be put into practice in the embodiments described below.

Figure 1:
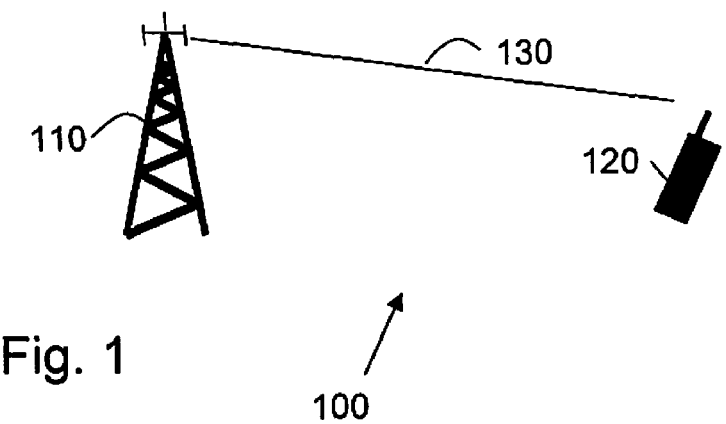
FIG. 1 is a schematic block diagram illustrating embodiments of a telecommunications system.

FIG. 1 depicts a telecommunication system 100, such as e.g. LTE, WCDMA, EDGE, and WLAN. The wireless telecommunication system comprises a sending node 110 and a receiving node 120.

The sending node 110 may be a base station such as e.g. a NodeB, an eNodeB, an eNB or any other network unit capable to sending or receiving data units over a radio link 130. The receiving node 120 may be a user equipment such as a wireless terminal, a mobile phone, a Personal Digital Assistant (PDA), or any other network node capable of sending or receiving data units over a radio link 130. It may also be the opposite, so that the receiving node 120 is base station and the sending node 110 is a user equipment.

The sending node 110 transmits data units such as e.g. PDUs over a radio link 130 to the receiving node 120. The sending node 110 and the receiving node 120 uses TDD. The data units are transmitted in a number of Transmission Time Intervals (TTI)s to the receiving node 120. TTI is a parameter in UMTS and other digital telecommunication networks related to encapsulation of data from higher layers into frames for transmission on the radio link layer. TTI refers to the length of an independently decodable transmission on the radio link. The TTI is related to the size of the data blocks passed from the higher network layers to the radio link layer. Thus a TTI may be referred to as a subframe of e.g. 1 ms. In this document, a TTI is from no on referred to as a subframe.

To improve throughput, the sending node 110 and the receiving node 120 may use Hybrid Automatic Repeat request (HARQ) mechanism. When the receiving node 120 receives data units transmitted from the sending node 110 in subframes, it will send a compressed ACK/NACK feedback report to the sending node 110 to confirm whether the transmitted data units are correctly received or not. The sending node 110 may then retransmit the data units for which a NACK feedback report were received.

According to the present solution, the receiving node 120 informs the sending node 110 about the received number of subframes in the compressed ACK/NACK feedback report e.g. in Physical Uplink Control Channel (PUCCH). The term "received number of subframes" may also be referred to as "bundled number of subframes" or "bundled number of TTIs". For example the receiving node 120 establishes that it has received three subframes and missed one subframe, i.e. for four subframes it generates ACK, ACK, NACK and ACK which when compressing the feedback results in that the received ACK/NACK feedback is NACK and the number of received subframes is four. According to some embodiments, the compressed ACK/NACK feedback is NACK if any of the received subframes are missed and ACK if all subframes are correctly received.

In some embodiments, different codes or code combinations in the ACK/NACK channel (PUCCH or HARQ Indicator Channel (PHICH)) may be mapped to the number of subframes. This will be described more in detail below. With compressed ACK/NACK combined with an indicator indicating the number of received subframes, e.g. in the form of a code or code combination, the transmitting node 110 can easily detect DTX. Different code combination defined for both transmitting node 110 and receiving node 120 can carry the information of different number of received subframes. By detecting DTX, it will not end to large burst delay in RLC or TCP layer, and thus reduce the higher layer throughput loss.

The sending node 110 receiving the feedback, then may judge ACK, NACK and DTX by comparing the detected number of subframes with the known transmitted ones per frame, together with the compressed ACK/NACK feedback. I.e. the sending node 110 knows about the number of subframes scheduled for a certain receiving node 120, so the sending node 110 can know judge whether the receiving node 120 missed downlink assignment or not according to the received number feedback from the receiving node 120.

According to some embodiments, when the sending node 110 receives the compressed ACK/NACK feedback it interprets the information and compares it with the transmitted number of subframes and decides whether to retransmit any subframe or not as follows:

A compressed ACK is detected+indicating same number of received subframes as transmitted by eNB.
  Decision: No retransmission for any of the subframes.
A compressed ACK is detected+indicating different number of received subframes as transmitted by eNB.
  Decision: Retransmit all the subframes;
A compressed NACK is detected+indicating same number of received subframes as transmitted by eNB.
  Decision: Retransmit all the subframes;
A Compressed NACK is detected+indicating different number of subframes as transmitted by eNB.
  Decision: Retransmit all the subframes.

The following describes some non-limiting and non-exclusive examples how to map the different number of received subframes to the codes. The solution may be used in Physical Uplink Control Channel (PUCCH) for Physical Downlink Shared Channel (PDSCH) as well as in downlink HARQ indicator channel (PHICH) for Physical Uplink Shared Channel (PUSCH). The codes used in PUCCH are Constant Amplitude Zero-Autocorrelation Code (CAZAC).

The simplest example according to one embodiment is to allocate multiple codes per receiving node 120 for Reference Signal (RS) and/or Data transmission, with each code or code combination corresponding to different number of received subframes associated to the compressed ACK/NACK. In some embodiments, only one code is used in PUCCH to carry the compressed ACK or NACK, so two codes will be used to carry the compressed ACK/NACK with the additional information to indicate the number of received subframes. In some embodiments the receiving node 120 can only select one code or code combination at one time. The sending node 110 e.g. base station can detect the number of subframes of compressed ACK/NACK combined with codes by detecting the code or code combination used in PUCCH. A good planning of codes allocation among different user equipments for RS and data transmission will preferably be performed.

In some embodiments using LTE PUCCH, a CAZAC sequence is allocated to the receiving node 120 as the demodulated RS, and also used to modulate data (UL feedbacks) from this receiving node 120. The code is used for demodulation RS and also modulated by the compressed ACK or NACK (data). To implement this solution, several CAZAC sequences may be allocated to each receiving node 120. In LTE rel-8, PUCCH comprises two resource blocks in frequency domain locating at either edge. So here, the CAZAC codes are a length-12 sequence, which is generated from Zadoff-Chu sequence.

According to one embodiment, each CAZAC sequence corresponds to a respective number of received subframes comprised in a compressed ACK/NACK such that
  CAZAC sequence #1 maps to single subframe,
  CAZAC sequence #2 maps to 2 subframes,
  CAZAC sequence #3 maps to 3 subframes, etc.

For each subframe, one receiving node 120 may only choose one CAZAC for PUCCH.

According to some other embodiments, each combination of CAZAC sequences corresponds to each number of received subframes of comprised in a compressed ACK/NACK.

If there is any NACK among the subframes,
  CAZAC sequence #1 for both RS and data is always used.
If the compressed ACK/NACK is ACK, then
  CAZAC sequence #1 for RS+CAZAC sequence #1 for data maps to 1 subframe;
  CAZAC sequence #1 for RS+CAZAC sequence #2 for data maps to 2 subframes;
  CAZAC sequence #2 for RS+CAZAC sequence #1 for data maps to 3 subframes;
  CAZAC sequence #2 for RS+CAZAC sequence #2 for data maps to 4 subframes.

Figure 2:
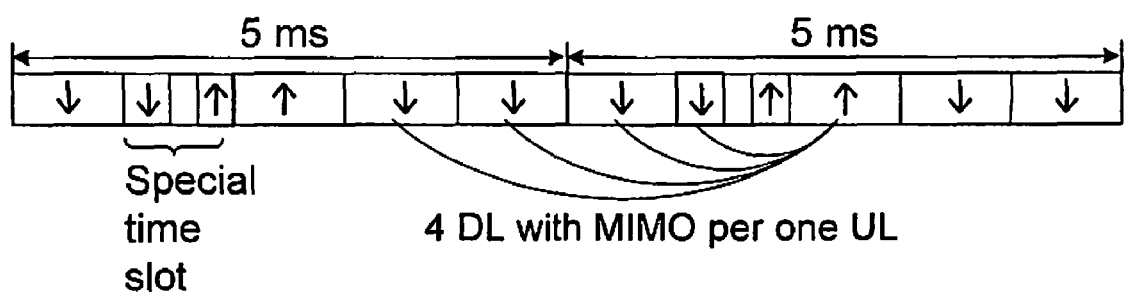
FIG. 2 is a schematic block diagram illustrating embodiments of a telecommunications system.

For TDD, the number of ACK/NACKs that could be transmitted in an UL subframe depends on the asymmetry. To improve coverage, capacity and possibly simplify the design, some form of combination of multiple ACK/NACKs may be used. This is also referred to as compression or bundling. FIG. 2 shows the extreme DL/UL asymmetry case with 5 ms DL/UL switching period.

In this example, four subframes can be allocated to one receiving node 120 by assuming data transmission in Downlink Piloting Time Slot (DwPTS) and only single UL subframe that can carry PUCCH for ACK/NACK. Assuming two-stream MIMO in each DL subframe transmission, there are in total eight coding blocks that need ACK/NACK feedbacks, i.e. 8 bits ACK/NACKs.

Taking the PUCCH format 1 for the received ACK/NACK transmission, 2 bits ACK/NACKs can be fed back to the sending node 110. There are two bundling solutions as below:

According to a first embodiment, firstly, combine the two streams for each subframe by 'AND' operation. Then combine the two neighboring subframes by 'AND' operation. Here, 'AND' means binary multiplying, e.g. ACK(1) 'AND' NACK (0) equals to NACK(0) Thus the first bit in PUCCH format 1 stands for the first two DL subframes, and the second bit in PUCCH format 1 stands for the second two DL subframes (including DwPTS).

This is considered to have a low impact on the time domain delay.

According to a second embodiment, for the first stream of MIMO, combine the ACK/NACKs in the four DL subframes. Thus the first bit in PUCCH format 1 stands for the first stream of all the four DL subframes, and the second bit stands for the second stream of all the four DL subframes.

The DL resource allocation is done once per subframe, which means that PDCCH carries the DL assignment information each DL subframe. If the receiving node 120 misses the DL assignment at one subframe, DTX will be fed back to the sending node 110 e.g. the base station. Downlink assignment is the scheduled information for a certain user equipment to indicate that the subframe is scheduled for the user equipment. The sending node 110 will retransmit the corresponding subframe(s) after receiving DTX or NACK. However, when bundling of ACK/NACKs for multiple subframes care shall preferably be taken as follows:

If any of the received subframes is NACK, the received one is NACK, independent of whether there is any DTX or not. Then all the subframes that map to the received feedback will be retransmitted, which will not trigger RLC layer ARQ, thus does not have serious delay problem.

If one subframe is DTX, while all the other subframes are ACKs, the received output is ACK. Then the PDU in the missed DL assignment subframe will be lost without triggering any physical layer retransmission, thus RLC layer ARQ will be triggered some time later, which will cause a serious delay problem at higher layer.

There is thus a need for the receiving node 120 and the sending node 110 to exchange the number of the assigned subframes within the ACK/NACK bundling window, either in DL or in UL.

When applying an UL control signalling the receiving node 120 informs the sending node 110 about the number of subframes together with the compressed ACK/NACK feedback in PUCCH. Then sending node 110 can establish or judge ACK, NACK and DTX by comparing the detected number of subframes with the known transmitted ones per frame, together with the compressed ACK/NACK feedback, as shown in Table 1.

TABLE 1

| Sending node 110 decision based on the received ACK/NACK | | |
|---|---|---|
| Sending node decision | Any DTX? | Received ACK/NACK |
| Retransmission | Not matter | NACK |
| | #assigned subframes reported by receiving node = #assigned subframes known at sending node => DTX | ACK |

TABLE 1-continued

| Sending node 110 decision based on the received ACK/NACK | | |
|---|---|---|
| Sending node decision | Any DTX? | Received ACK/NACK |
| No retransmission | #assigned subframes reported by receiving node = #assigned subframes known at sending node => No DTX | ACK |

One simple method of reporting the number of recognized subframes on PUCCH is to allocate multiple CAZAC sequences per receiving node 120, which provides more possibilities by allocating them for either demodulation RS or ACK/NACK data. For the example shown in FIG. 2, only two CAZAC sequences, i.e. CAZAC1 and CAZAC2, can report up to 4 assigned subframes and Table 2 shows the detailed indication on PUCCH by a receiving node 120 and/or a sending node 110 as one case.

TABLE 2

| Indication on PUCCH CAZAC sequences for RS and ACK/NACK | | |
|---|---|---|
| #subframes detected by receiving node | CAZAC sequence index for data | CAZAC sequence index for RS |
| 1 assigned subframe | CAZAC1 | CAZAC1 |
| 2 assigned subframes | CAZAC1 | CAZAC2 |
| 3 assigned subframes | CAZAC2 | CAZAC1 |
| 4 assigned subframes | CAZAC2 | CAZAC2 |

The sending node 110 may do a blind detection by correlating the CAZAC sequences allocated for the receiving node 120 in both demodulation reference signal field and ACK/NACK data field. In addition, Table 2 may even support up to 8:1 DL/UL asymmetry with 10 ms periodicity.

In some embodiments the present solution supports a ACK/NACK bundling mode, whereby for the ACK/NACK bundling mode associate each DL subframe with an UL subframe. Each UL subframe is then associated with K subframes, where K can be zero, one or up to nine, depending for example on the asymmetry;

combine ACK/NACK reports from the set of associated DL subframes to generate a single ACK/NACK report of PUCCH format 1, i.e. 2 bits for the K associated DL subframes;

the bundling is firstly done for the multiple streams per subframe, and then for multiple subframes;

generating may, for instance, include an ACK, which is generated if all assigned DL subframes are ACK and a NACK is generate if all at least one of the assigned DL subframes is NACK and the rest are ACK. Otherwise, DTX or NACK is generated.

The receiving node 120 and the sending node 110 need to exchange the number of previously assigned DL subframes within the set of associated DL subframes. This number is between 1 and K and may be indicated to the receiving node 120 as follows:

Encode the number by using multiple CRC polynomials or a single CRC polynomial and different scrambling sequences to scramble the calculated CRC For DL control signalling, include a number of bits in the normal DL assignment, but not in the compact DL format.

For UL control signalling, adopt multiple CAZAC sequences per receiving node 120 in PUCCH.

The method steps in the receiving node 120, for sending an acknowledgement/not acknowledgement "ACK/NACK" feedback report of received data units over a radio, according to some embodiments will now be described with reference to a flowchart depicted in FIG. 3. The method in the receiving node 120 comprises the steps of:

---

301. The receiving node 120 receives data units in a number of subframes over a first radio link from the sending node 110.
302. The receiving node 120 creates an ACK/NACK feedback report. The report is compressed such that it comprises one single ACK/NACK feedback relating to the data units in the number of received subframes. The report further comprises an indicator indicating said number of received subframes.
303. The receiving node 120 then transmits the created ACK/NACK feedback report to the sending node 110 over a second radio link. The feedback report renders it feasible for the sending node 110 to decide whether a retransmission of any subframe is required or not based on a comparison of the reported number of received subframes with the known transmitted number of subframes per frame, together with the compressed ACK/NACK feedback report.

---

In some embodiments, the indicator is represented by a code or a combination of codes. The code or combination of codes corresponds to a specific number of received subframes associated to the compressed ACK/NACK feedback report.

According to some embodiments a Physical Uplink Control Channel "PUCCH" is used for the transmission of the ACK/NACK feedback report over the second radio link. In some of these embodiments, the code or code combination is represented by CAZAC sequences.

In a specific first embodiment, each CAZAC sequence correspond to a respective number of received subframes indicated in the compressed ACK/NACK feedback such that CAZAC sequence #1 maps to a single subframe, CAZAC sequence #2 maps to 2 subframes, CAZAC sequence #3 maps to 3 subframes, etc.

According to some embodiments, the code or code combination is used related to a code for RS and/or a code for data transmission.

According to some of these embodiments a combination of CAZAC sequences corresponds to a specific number of received subframes in the compressed ACK/NACK feedback report. When the compressed ACK/NACK feedback report is a NACK, then a CAZAC sequence #1 may be used for both RS and data transmission. When the compressed ACK/NACK feedback report is an ACK, then CAZAC sequence #1 for RS+CAZAC sequence #1 for data may map to 1 subframe; CAZAC sequence #1 for RS+CAZAC sequence #2 for data may map to 2 subframes; CAZAC sequence #2 for RS+CAZAC sequence #1 for data may map to 3 subframes; and CAZAC sequence #2 for RS+CAZAC sequence #2 for data may map to 4 subframes.

Figures 3, 4:
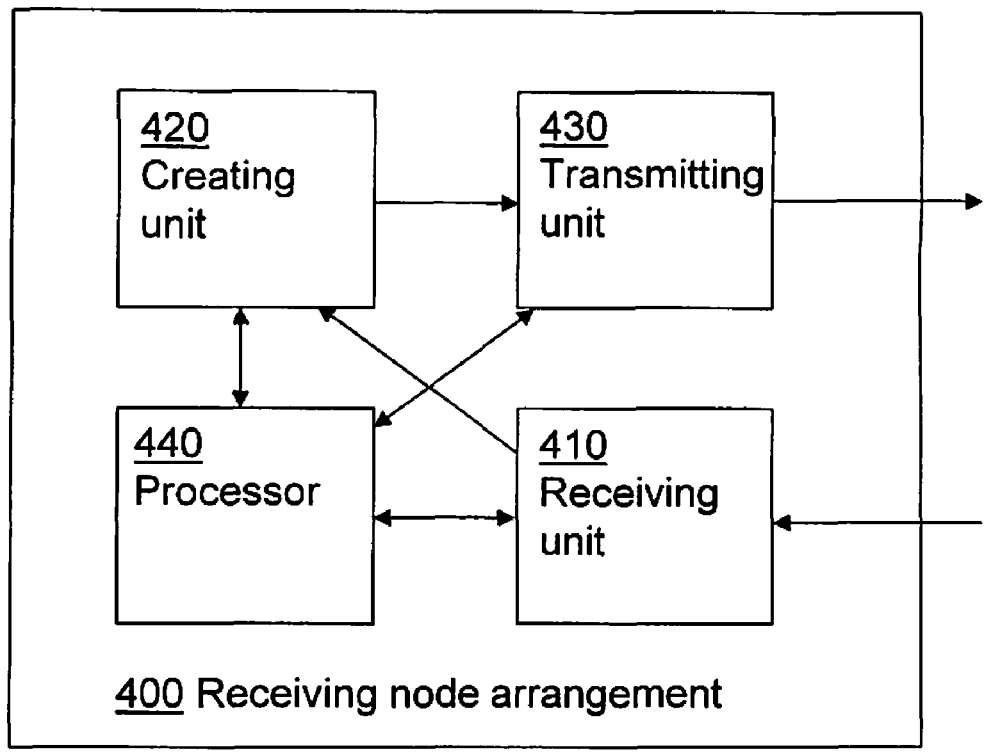
FIG. 3 is a flow chart illustrating embodiments of a method in a receiving node.
FIG. 4 is a schematic block diagram illustrating embodiments of a receiving node arrangement.

To perform the method steps above, the receiving node comprises an arrangement 400 depicted in FIG. 4. The receiving node arrangement 400 may be regarded as an apparatus.

The receiving node arrangement 400 comprises a receiving unit 410 configured to receive data units in a number of subframes over a first radio link from the sending node 110.

The receiving node arrangement 400 further comprises a creating unit 420 configured to create an ACK/NACK feedback report. The report is compressed such that it comprises a single ACK/NACK feedback relating to the data units in the number of received subframes. The report comprises an indicator indicating said number of received subframes.

The receiving node arrangement 400 further comprises a transmitting unit 430 configured to transmit the created ACK/NACK feedback report to the sending node 110 over a second radio link. The feedback report renders it feasible for the sending node 110 to decide whether a retransmission of any subframe is required or not based on a comparison of the reported number of received subframes with the known transmitted number of subframes per frame, together with the compressed ACK/NACK feedback report.

In some embodiments the indicator is represented by a code or a combination of codes wherein the code or combination of codes corresponds to a specific number of received subframes associated to the compressed ACK/NACK feedback report.

PUCCH may be used for the transmission of the ACK/NACK feedback report over the second radio link. Here, the code or code combination may represented by a CAZAC sequence where each CAZAC sequence corresponds to a respective number of received subframes indicated in the compressed ACK/NACK feedback, such that CAZAC sequence #1 maps to a single subframe, CAZAC sequence #2 maps to 2 subframes, CAZAC sequence #3 maps to 3 subframes, etc.

In some embodiments wherein the code or code combination is used, the code or code combination may be related to a code for Reference Signal (RS) and/or a code for data transmission. When the compressed ACK/NACK feedback report is a NACK, then a CAZAC sequence #1 is used for both RS and data transmission. When the compressed ACK/NACK feedback report is an ACK, then CAZAC sequence #1 for RS+CAZAC sequence #1 for data may map to 1 subframe; CAZAC sequence #1 for RS+CAZAC sequence #2 for data may map to 2 subframes; CAZAC sequence #2 for RS+CAZAC sequence #1 for data may map to 3 subframes; CAZAC sequence #2 for RS+CAZAC sequence #2 for data may map to 4 subframes.

The method steps in the sending node 110 for handling of an acknowledgement/not acknowledgement "ACK/NACK" feedback report sent from a receiving node 120 according to some embodiments will now be described with reference to a flowchart depicted in FIG. 5. The method in the sending node 110 comprises the steps of:

501. The sending node 110 transmits data units in a number of subframes to the receiving node 120 over a first radio link.
502. The sending node 110 receives an ACK/NACK feedback report from the receiving node 120. The report is compressed such that it comprises a single ACK/NACK feedback relating to data units associated to the number of received subframes. The report comprises an indicator indicating said number of received subframes.
503. The sending node 110 decides whether a retransmission of any subframe is required or not based on a comparison of the indicated number of received subframes with the known transmitted number of subframes per frame, together with the compressed ACK/NACK feedback.

In some embodiments, wherein the ACK/NACK feedback report comprises a compressed ACK and the indicator indicates the same number of received subframes as transmitted by the sending node 110, the step of deciding may comprise deciding no retransmission of any of the subframes.

In an alternative, wherein the ACK/NACK feedback report comprises a compressed ACK and the indicator indicates different number of received subframes as transmitted by the sending node 110, the step of deciding may comprise deciding retransmission of all the subframes.

In a further alternative, wherein the ACK/NACK feedback report comprises a compressed NACK and the indicator indicates the same number of received subframes as transmitted by the sending node 110, the step of deciding comprises deciding retransmission of all the subframes.

In a yet further alternative, wherein the ACK/NACK feedback report comprises a compressed NACK and the indicator indicating different number of subframes as transmitted by the sending node 110, the step of deciding may comprise deciding retransmission of all the subframes.

In some embodiments the indicator is represented by a code or a combination of codes wherein the code or combination of codes corresponds to a specific number of received subframes associated to the compressed ACK/NACK feedback report.

PUCCH may be used for the transmission of the ACK/NACK feedback report over the second radio link. Here, the code or code combination may represented by a CAZAC sequence where each CAZAC sequence corresponds to a respective number of received subframes indicated in the compressed ACK/NACK feedback, such that CAZAC sequence #1 maps to a single subframe, CAZAC sequence #2 maps to 2 subframes, CAZAC sequence #3 maps to 3 subframes, etc.

In some embodiments wherein the code or code combination is used, the code or code combination may be related to a code for Reference Signal (RS) and/or a code for data transmission. When the compressed ACK/NACK feedback report is a NACK, then a CAZAC sequence #1 is used for both RS and data transmission. When the compressed ACK/NACK feedback report is an ACK, then CAZAC sequence #1 for RS+CAZAC sequence #1 for data may map to 1 subframe; CAZAC sequence #1 for RS+CAZAC sequence #2 for data may map to 2 subframes; CAZAC sequence #2 for RS+CAZAC sequence #1 for data may map to 3 subframes; CAZAC sequence #2 for RS+CAZAC sequence #2 for data may map to 4 subframes.

Figures 5, 6:
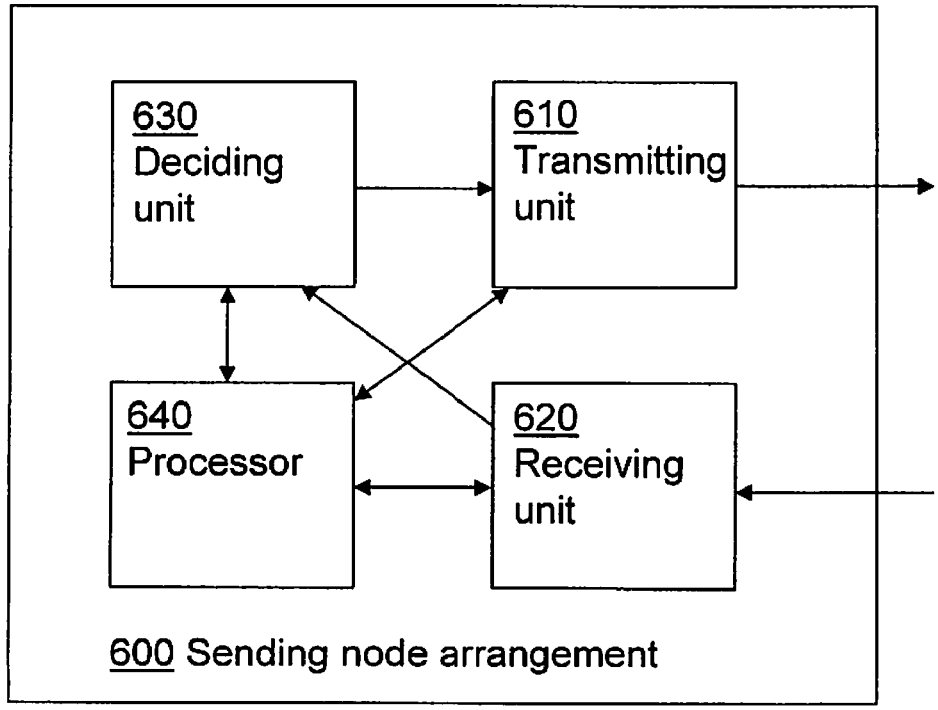
FIG. 5 is a flow chart illustrating embodiments of a method in a sending node.
FIG. 6 is a schematic block diagram illustrating embodiments of a sending node arrangement.

To perform the method steps above for handling of an acknowledgement/not acknowledgement "ACK/NACK" feedback report sent from a receiving node 120 sending node 110 comprises an arrangement 600 depicted in FIG. 6. The arrangement shall be understood as an apparatus.

The sending node arrangement 600 comprises a transmitting unit 610 configured to transmit data units in a number of subframes to the receiving node 120.

The sending node arrangement 600 further comprises a receiving unit 620 configured to receive an ACK/NACK feedback report from the receiving node 120. The report is compressed such that it comprises a single ACK/NACK feedback relating to data units associated to the number of received subframes. The report further comprises an indicator indicating said number of received subframes.

The sending node arrangement 600 further comprises a deciding unit 630 configured to decide whether a retransmission of any subframe is required or not based on a comparison of the indicated number of received subframes with the known transmitted number of subframes per frame, together with the compressed ACK/NACK feedback.

In some embodiments, wherein the ACK/NACK feedback report comprises a compressed ACK and the indicator indicates the same number of received subframes as transmitted by the sending node 110, the deciding unit 630 is configured to decide no retransmission of any of the subframes.

In one alternative, wherein the ACK/NACK feedback report comprises a compressed ACK and the indicator indicates different number of received subframes as transmitted by the sending node 110, the deciding unit 630 is configured to decide retransmission of all the subframes.

In a further alternative, wherein the ACK/NACK feedback report comprises a compressed NACK and the indicator indicates the same number of received subframes as transmitted by the sending node 110, the deciding unit 630 is configured to decide retransmission of all the subframes.

In a yet further alternative, wherein the ACK/NACK feedback report comprises a compressed NACK and the indicator indicating different number of subframes as transmitted by the sending node 110, the deciding unit 630 is configured to decide retransmission of all the subframes.

In some embodiments the indicator is represented by a code or a combination of codes wherein the code or combination of codes corresponds to a specific number of received subframes associated to the compressed ACK/NACK feedback report. PUCCH may be intended to be used for the transmission of the ACK/NACK feedback report over the second radio link. Here, the code or code combination may represented by a CAZAC sequence where each CAZAC sequence corresponds to a respective number of received subframes indicated in the compressed ACK/NACK feedback, such that CAZAC sequence #1 maps to a single subframe, CAZAC sequence #2 maps to 2 subframes, CAZAC sequence #3 maps to 3 subframes, etc.

In some embodiments wherein the code or code combination is used, the code or code combination may be related to a code for Reference Signal (RS) and/or a code for data transmission. When the compressed ACK/NACK feedback report is a NACK, then a CAZAC sequence #1 is used for both RS and data transmission. When the compressed ACK/NACK feedback report is an ACK, then CAZAC sequence #1 for RS+CAZAC sequence #1 for data may map to 1 subframe; CAZAC sequence #1 for RS+CAZAC sequence #2 for data may map to 2 subframes; CAZAC sequence #2 for RS+CAZAC sequence #1 for data may map to 3 subframes; CAZAC sequence #2 for RS+CAZAC sequence #2 for data may map to 4 subframes.

The present mechanism for sending an acknowledgement/not acknowledgement "ACK/NACK" feedback report, and the present mechanism for handling an acknowledgement/not acknowledgement "ACK/NACK" feedback report, may be implemented through one or more processors, such as a processor 440 in the receiving node arrangement 400 depicted in FIG. 4 or the processor 640 in the sending node arrangement 600 depicted in FIG. 6, together with computer program code for performing the functions of the present solution. The program code mentioned above may also be provided as a computer program product, for instance in the form of a data carrier carrying computer program code for performing the present solution when being loaded into the receiving node 120 or the sending node 110. One such carrier may be in the form of a CD ROM disc. It is however feasible with other data carriers such as a memory stick. The computer program code can furthermore be provided as pure program code on a server and downloaded to the receiving node 120 or the sending node 110 remotely.

The term uplink means the communication from a user equipment to a base station and the term downlink means the communication from a base station to a user equipment.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a receiving node (120) for sending an acknowledgement/not acknowledgement "ACK/NACK" feedback report of received data units over a radio link, the method comprising the steps of:
   receiving (301) data units in a number of subframes over a first radio link from a sending node (110),
   creating (302) a ACK/NACK feedback report, which report is compressed such that it comprises one single ACK/NACK feedback relating to the data units in the number of received subframes, and which report comprises an indicator indicating said number of received subframes,
   transmitting (303) the created ACK/NACK feedback report to the sending node (110) over a second radio link, which feedback report renders it feasible for the sending node (110) to decide whether a retransmission of any subframe is required or not based on a comparison of the reported number of received subframes with the known transmitted number of subframes per frame, together with the compressed ACK/NACK feedback report.

2. Method according to claim 1, wherein the indicator is represented by a code, wherein the code corresponds to a specific number of received subframes associated to the compressed ACK/NACK feedback report.

3. Method according to claim 2, wherein Physical Uplink Control Channel "PUCCH" is used for the transmission of the ACK/NACK feedback report over the second radio link and wherein the code or code combination is represented by a Constant Amplitude Zero Autocorrelation "CAZAC" sequences, each CAZAC sequence corresponding to a respective number of received subframes indicated in the compressed ACK/NACK feedback such that CAZAC sequence #1 maps to a single subframe, CAZAC sequence #2 maps to 2 subframes, CAZAC sequence #3 maps to 3 subframes, etc.

4. Method according to claim 2, wherein the code is represented by a combination of codes.

5. Method according to any of the claims 2-4, wherein the code or code combination is used related to a code for Reference Signal (RS) and/or a code for data transmission.

6. Method according to claim 5, wherein Physical Uplink Control Channel "PUCCH" is used for the transmission of the ACK/NACK feedback report over the second radio link, and wherein a combination of CAZAC sequences corresponds to indicate a specific number of received subframes in the compressed ACK/NACK feedback report, and when the compressed ACK/NACK feedback report is a NACK, then a CAZAC sequence #1 is used for both RS and data transmission.

7. Method according to claim 5, wherein Physical Uplink Control Channel "PUCCH" is used for the transmission of the ACK/NACK feedback report over the second radio link, and wherein a combination of CAZAC sequences corresponds to indicate a specific number of received subframes in the compressed ACK/NACK feedback report, and when the compressed ACK/NACK feedback report is an ACK, then CAZAC sequence #1 for RS+CAZAC sequence #1 for data maps to 1 subframe; CAZAC sequence #1 for RS+CAZAC sequence #2 for data maps to 2 subframes; CAZAC sequence #2 for RS+CAZAC sequence #1 for data maps to 3 subframes; CAZAC sequence #2 for RS+CAZAC sequence #2 for data maps to 4 subframes.

8. A method in a sending node (110) for handling of an acknowledgement/not acknowledgement "ACK/NACK" feedback report sent from a receiving node (120) over a radio link, the method comprising the steps of:
   transmitting (501) data units in a number of subframes to the receiving node (120) over a first radio link,
   receiving (502) an ACK/NACK feedback report from the receiving node (120) over a second radio link,
   which report is compressed such that it comprises one single ACK/NACK feedback relating to data units associated to the number of received subframes, and which report comprises an indicator indicating said number of received subframes,
   deciding (503) whether a retransmission of any subframe is required or not based on a comparison of the indicated number of received subframes with the known transmitted number of subframes per frame, together with the compressed ACK/NACK feedback.

9. A method according to claim 8, wherein the ACK/NACK feedback report comprises a compressed ACK and the indicator indicates the same number of received subframes as transmitted by the sending node (110), and wherein the step of deciding (503) comprises deciding no retransmission of any of the subframes.

10. A method according to claim 8, wherein the ACK/NACK feedback report comprises a compressed ACK and the indicator indicates different number of received subframes as transmitted by the sending node (110), and wherein the step of deciding (503) comprises deciding retransmission of all the subframes.

11. A method according to claim 8, wherein the ACK/NACK feedback report comprises a compressed NACK and the indicator indicates the same number of received subframes as transmitted by the sending node (110), and wherein the step of deciding (503) comprises deciding retransmission of all the subframes.

12. A method according to claim 8, wherein the ACK/NACK feedback report comprises a compressed NACK and the indicator indicating different number of subframes as transmitted by the sending node (110), and wherein the step of deciding (503) comprises deciding retransmission of all the subframes.

13. A method according to any of the claims 8-12, wherein the indicator is represented by a code which code corresponds to a specific number of received subframes associated to the compressed ACK/NACK feedback report.

14. A method according to claim 13, wherein the code is represented by a combination of codes, which code combination, corresponds to a specific number of received subframes associated to the compressed ACK/NACK feedback report.

15. A method according to any of the claims 13-14, wherein Physical Uplink Control Channel "PUCCH" is used for the reception of the ACK/NACK feedback report over the second radio link, and wherein the code or code combination is represented by a Constant Amplitude Zero Autocorrelation "CAZAC" sequences, each CAZAC sequence corresponding to a respective number of received subframes indicated in the compressed ACK/NACK feedback such that CAZAC sequence #1 maps to a single subframe, CAZAC sequence #2 maps to 2 subframes, CAZAC sequence #3 maps to 3 subframes, etc.

16. A method according to any of the claims 13-15, wherein the code or code combination is used related to a code for Reference Signal (RS) and/or a code for data transmission.

17. A method according to claim 16, wherein Physical Uplink Control Channel "PUCCH" is used for the reception of the ACK/NACK feedback report over the second radio link, and wherein a combination of CAZAC sequences corresponds to indicate a specific number of received subframes in the compressed ACK/NACK feedback report, and when the compressed ACK/NACK feedback report is a NACK, then a CAZAC sequence #1 is used for both RS and data transmission.

18. A method according to claim 16, wherein Physical Uplink Control Channel "PUCCH" is used for the reception of the ACK/NACK feedback report over the second radio link, and wherein a combination of CAZAC sequences corresponds to indicate a specific number of received subframes in the compressed ACK/NACK feedback report, and when the compressed ACK/NACK feedback report is an ACK, then CAZAC sequence #1 for RS+CAZAC sequence #1 for data maps to 1 subframe; CAZAC sequence #1 for RS+CAZAC sequence #2 for data maps to 2 subframes; CAZAC sequence #2 for RS+CAZAC sequence #1 for data maps to 3 subframes; CAZAC sequence #2 for RS+CAZAC sequence #2 for data maps to 4 subframes.

19. An arrangement (400) in a receiving node (120) for sending an acknowledgement/not acknowledgement "ACK/NACK" feedback report of received data units over a radio link, the receiving node arrangement (400) comprising:
- a receiving unit (410) configured to receive data units in a number of subframes over a first radio link from a sending node (110),
- a creating unit (420) configured to create a ACK/NACK feedback report, which report is compressed such that it comprises one single ACK/NACK feedback relating to the data units in the number of received subframes, and which report comprises an indicator indicating said number of received subframes,
- a transmitting unit (430) configured to transmit the created ACK/NACK feedback report to the sending node (110) over a second radio link, which feedback report renders it feasible for the sending node (110) to decide whether a retransmission of any subframe is required or not based on a comparison of the reported number of received subframes with the known transmitted number of subframes per frame, together with the compressed ACK/NACK feedback report.

20. An arrangement (600) in a sending node (110) for handling of an acknowledgement/not acknowledgement "ACK/NACK" feedback report sent from a receiving node (120) over a radio link (130), the sending node arrangement comprising:
- a transmitting unit (610) configured to transmit data units in a number of subframes to the receiving node (120) over a first radio link,
- a receiving unit (620) configured to receive an ACK/NACK feedback report from the receiving node (120) over a second radio link, which report is compressed such that it comprises one single ACK/NACK feedback relating to data units associated to the number of received subframes, and which report comprises an indicator indicating said number of received subframes,
- a deciding unit (630) configured to decide whether a retransmission of any subframe is required or not based on a comparison of the indicated number of received subframes with the known transmitted number of subframes per frame, together with the compressed ACK/NACK feedback.

* * * * *

UNITED STATES PATENT AND TRADEMARK OFFICE
CERTIFICATE OF CORRECTION

PATENT NO. : 8,281,204 B2  
APPLICATION NO. : 12/865814  
DATED : October 2, 2012  
INVENTOR(S) : Hu et al.

Page 1 of 1

It is certified that error appears in the above-identified patent and that said Letters Patent is hereby corrected as shown below:

Title Page, Item (75), under "Inventors", in Column 1, Line 2, delete "Taby" and insert -- Täby --, therefor.

In the Specification

In Column 1, Line 59, delete "report s" and insert -- reports --, therefor.

In Column 4, Line 56, delete "(TTI)s" and insert -- (TTIs) --, therefor.

In Column 4, Line 64, delete "from no on" and insert -- from now on --, therefor.

In Column 7, Line 8, before "Thus", delete "(0)" and insert -- (0). --, therefor.

Signed and Sealed this  
Twenty-fourth Day of September, 2013

Teresa Stanek Rea  
*Deputy Director of the United States Patent and Trademark Office*